(12) United States Patent
Renner et al.

(10) Patent No.: US 11,813,681 B2
(45) Date of Patent: Nov. 14, 2023

(54) CUTTING TOOL

(71) Applicant: HUSQVARNA AB, Huskvarna (SE)

(72) Inventors: Thomas Renner, Ulm (DE); Haceli Öztürk, Allmendingen (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/799,788

(22) PCT Filed: Nov. 16, 2020

(86) PCT No.: PCT/EP2020/082200
§ 371 (c)(1),
(2) Date: Aug. 15, 2022

(87) PCT Pub. No.: WO2021/175465
PCT Pub. Date: Sep. 10, 2021

(65) Prior Publication Data
US 2023/0078974 A1 Mar. 16, 2023

(30) Foreign Application Priority Data
Mar. 2, 2020 (EP) ...................................... 20160353

(51) Int. Cl.
*B23D 21/00* (2006.01)
*B23D 21/10* (2006.01)
*B26D 3/16* (2006.01)

(52) U.S. Cl.
CPC ........... *B23D 21/006* (2013.01); *B23D 21/10* (2013.01); *B26D 3/169* (2013.01)

(58) Field of Classification Search
CPC .......... B26D 3/16; B26D 21/06; B23D 21/08; B23D 21/10; B23D 21/02; B23D 21/006; B23D 21/003
See application file for complete search history.

(56) References Cited

U.S. PATENT DOCUMENTS 3,748,933 A  7/1973 De Shazor
4,146,959 A * 4/1979 Hopper .................. B26D 3/169
30/95

(Continued)

FOREIGN PATENT DOCUMENTS

DE  9214128 U1  12/1992
EP  204802 B1  3/1991

(Continued)

OTHER PUBLICATIONS

International Search Report and Written Opinion from International Application No. PCT/EP2020/082200 dated Feb. 18, 2021.

*Primary Examiner* — Jennifer S Matthews
(74) *Attorney, Agent, or Firm* — Burr & Forman LLP (57) ABSTRACT

A hand operated cutting tool (200) for pipes or tubes includes a housing (202). The housing (202) defining at least one first opening (204) to receive an object (210) to perform a first cutting action, and a second opening (206) which is adapted to perform a second cutting action. The first opening (204) includes a longitudinal axis (A-A1) and the second opening (206) include a longitudinal axis (X-X'). The longitudinal axis (A-A1) and the longitudinal axis (X-X') include an angle (Z) therebetween that is unequal to 0 degree. And, one or more cutting blades (208, 502) are operatively coupled to the first opening (204) and the second opening (206). The one or more cutting blades (208) is arranged such that it is performing both the first cutting action and the second cutting action.

10 Claims, 6 Drawing Sheets

(56) References Cited

U.S. PATENT DOCUMENTS

2011/0179649 A1 7/2011 Park
2018/0319030 A1* 11/2018 Hung .................... B26B 1/02

FOREIGN PATENT DOCUMENTS

| EP | 1300212 A2 | 4/2003 | | |
|----|------------|--------|---|---|
| FR | 2284423 A1 | 4/1976 | | |
| GB | 1487033 A | 9/1977 | | |
| GB | 2207377 A | 2/1989 | | |
| GB | 2295787 A | 6/1996 | | |
| GB | 2454002 A | 4/2009 | | |
| GB | 2457346 A | * | 8/2009 | ............ B26D 3/169 |
| GB | 2457447 B | 3/2012 | | |
| GB | 2558990 A | 7/2018 | | |
| WO | 8100225 A1 | 2/1981 | | |
| WO | 2011044081 A2 | 4/2011 | | |

* cited by examiner

*Prior Art*

FIG. 1B

*Prior Art*

CUTTING TOOL

TECHNICAL FIELD

The present disclosure relates to a cutting tool. More specifically, the present disclosure relates to the cutting tool which allows different cutting operations on pipes, tubes and the like.

BACKGROUND

A cutting tool is any device used to remove a material from a workpiece by shear deformations. The cutting tool may do different cutting actions like chamfering, grinding, sawing, and the like. Generally, the cutting tool has different cutting sources like cutting blades, chamfering edges, reamers, finishing tools, cutting wheels, and the like.

However, there may be instances where cutting tools such as garden shears, and saw may deform or crush pipes, tubes and the like. An uneven cutting or chamfering of pipes, and tubes makes it inconvenient for desired applications such as to insert the cut pipe into pipe connectors.

An example of a cutting tool is provided in GB patent application GB 2,454,002 A (hereinafter referred to as '002 reference). The '002 reference provides cutting device includes a pair of arcuate support walls which are held apart and on opposite sides of a central axis by a pair of interconnecting walls also lying on opposite sides of the axis. The interconnecting walls include at least a flexible and resilient portion to allow the support walls to move towards each other and against their resilience and upon resiling to displace the support walls away from each other. Each support wall carries a blade orientated to be able to cut into, and upon rotation, to sever articles placed along said axis. One side interconnecting wall defines a slot containing an auxiliary cutting blade. However, the '002 reference makes application of multiple blades to cut different articles. Further, the cutting device seems to provide a complex arrangement of the multiple blades to cut the articles, which involves movement of the support walls during cutting operations.

Thus, there is a need for an improved cutting tool which allows immaculate and even cutting with different cutting operations for pipes, tubes and the like.

SUMMARY

In view of the above, it is an objective of the present invention to solve or at least reduce the drawbacks discussed above. The objective is at least partially achieved by a hand operated cutting tool for pipes or tubes. The hand operated cutting tool includes a housing. The housing defines at least one first opening to receive an object to perform a first cutting action, and a second opening which is adapted to perform a second cutting action. The first opening includes a longitudinal axis, and the second opening includes a longitudinal axis. The longitudinal axis and the longitudinal axis include an angle therebetween that is unequal to 0 degree. And, one or more cutting blades are operatively coupled to the first opening and the second opening. The hand operated cutting tool is characterized in that the one or more cutting blades is arranged such that it is performing both the first cutting action and the second cutting action. Thus, the present disclosure provides a simple, convenient and efficient cutting tool which allows different cutting actions on objects while taking advantage of a single cutting blade of the cutting tool.

According to an embodiment of the present invention, the cutting tool further includes an end stop in the one or more of the first opening and second opening to limit a height of any of the first cutting action and the second cutting action of the object. The end stop avoids any unnecessary cutting of the object.

According to an embodiment of the present invention, each of the first cutting action and the second cutting action is performed by a single blade. This results in that the one or more cutting blades act on the object at a different angle and/or different cutting action when being cut by the blade.

According to an embodiment of the present invention, the angle between the longitudinal axis of the first opening and the longitudinal axis of the second opening is from 45-60 degrees. The angle may be any value as per the application, such as to suit one or more of the first opening, and the second opening.

According to an embodiment of the present invention, the object is one or more of a pipe, and a tube. The cut and chamfered pipe/tube may find appropriate applications such as for being inserted effectively into a pipe connector and the like.

According to an embodiment of the present invention, the cutting tool is hand operable. The cutting tool helps to avoid need of any external source or tool to perform the cutting process.

According to an embodiment of the present invention, the first cutting action is cutting, and the second cutting action is chamfering. The first cutting action and the second cutting action improve aesthetical properties and workability of the object. The first cutting action and the second cutting action also improve assembling capability of several parts to form desired (say welded) structures.

According to an embodiment of the present invention, the cutting tool further includes one or more adapters which operatively couple with the one or more first opening and second opening. The one or more adapters are selected in accordance with a dimension of the object. The one or more adapters cater to pipes as per different dimensions, more specifically diameter of the pipes.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

Figure 1A:
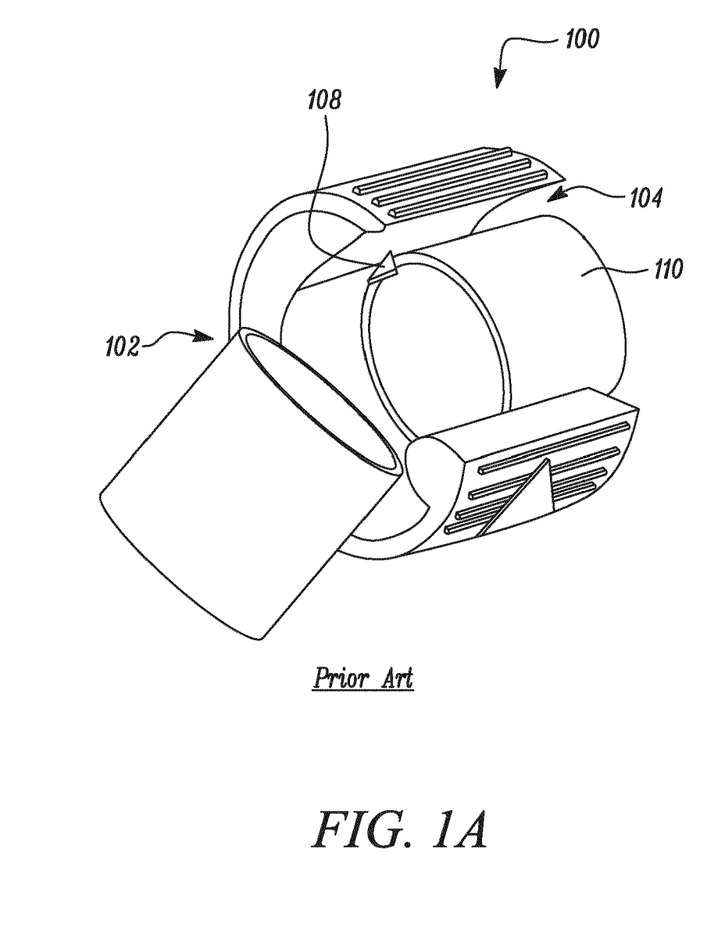
FIGS. 1A and 1B show perspective views of different conventional cutting tools which allow different cutting actions.

FIG. 1A illustrates a conventional cutting tool 100. The conventional cutting tool 100 helps in machining such as cutting a desired part of the workpiece by doing certain cutting actions. The conventional cutting tool 100 may be used in gardens, industries to cut various objects such as pipes, tubes, and the like. The conventional cutting tool 100 includes a housing 102. The conventional cutting tool 100 includes an opening 104. The conventional cutting tool 100 further includes a blade 108. A pipe 110 is inserted in the opening 104. On rotating the pipe 110, the conventional cutting tool 100 cuts the pipe 110 into desired pieces.

Figure 1B:
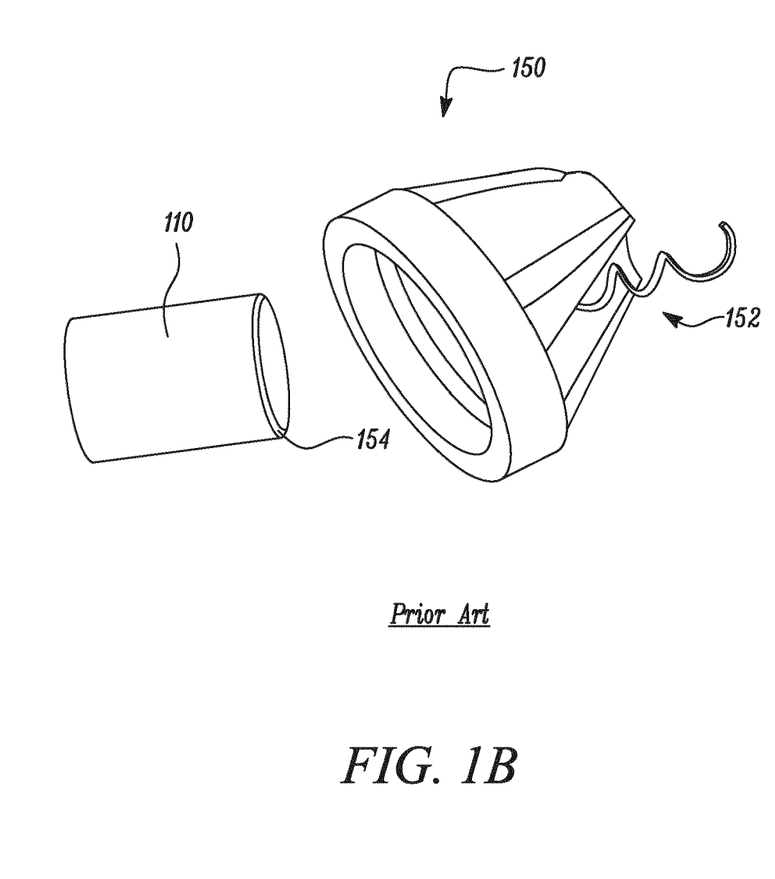

FIG. 1B illustrates a conventional cutting tool 150. The conventional cutting tool 150 has a blade 152. The blade 152 helps in chamfering of a pipe 110 on rotating the pipe 110 inside the conventional cutting tool 150. The conventional cutting tool 150 shows a chamfered pipe end 154. The conventional cutting tools 100 and 150 both perform different cutting actions. However, the conventional cutting tools 100 and 150 individually are able to perform only a single cutting action i.e. cutting and chamfering respectively. This may lead to concerns related to storage and maintenance of multiple cutting tools along with other implementation issues involved.

Figure 2A:
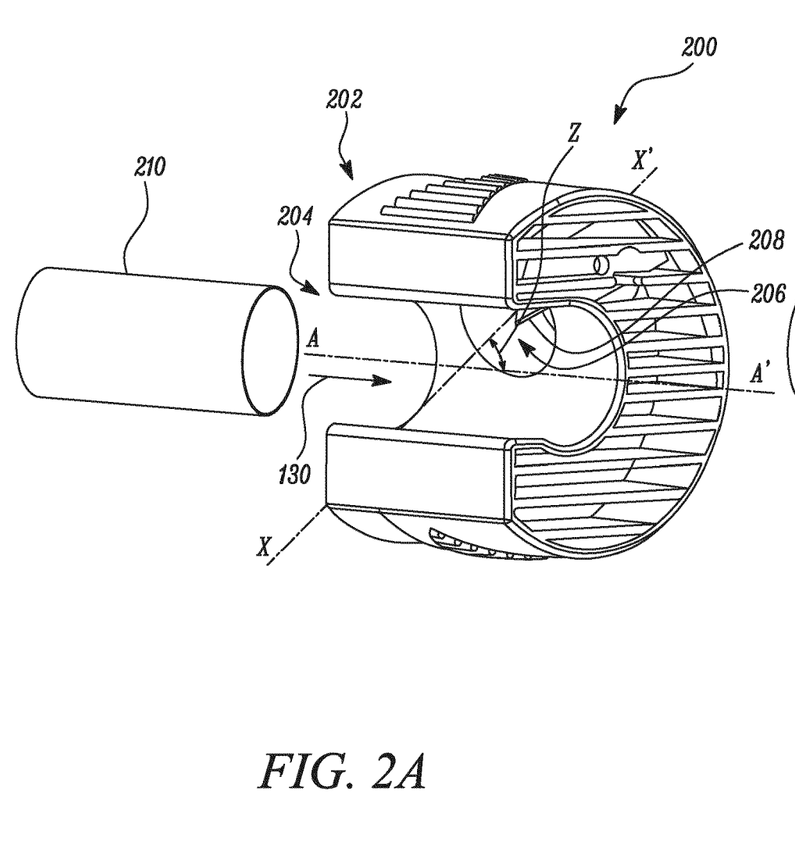
FIGS. 2A and 2B show perspective views of a cutting tool before and after performing a cutting action, in accordance with an aspect of the present disclosure.
Figure 2B:
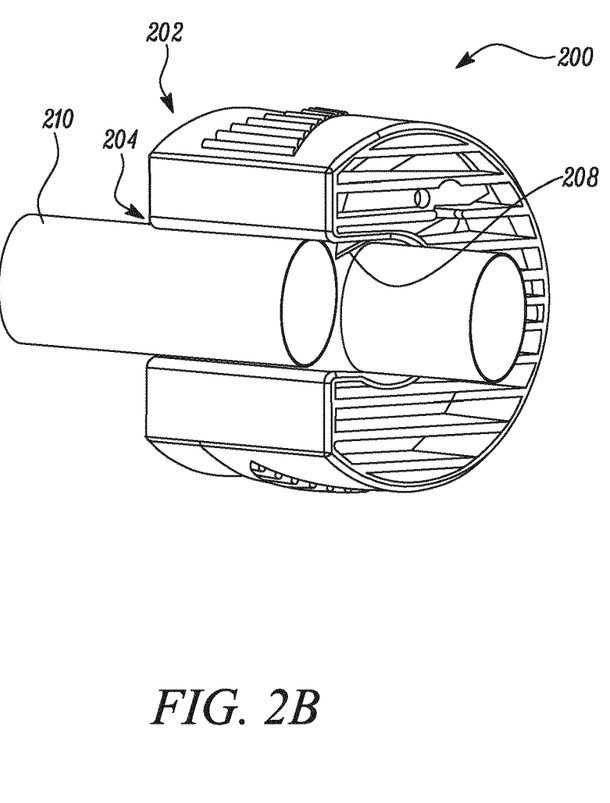

FIGS. 2A and 2B show perspective views of a hand operated cutting tool 200 (alternatively, a cutting tool 200) before and after performing a cutting action. The cutting tool 200 includes a housing 202. The housing 202 includes one or more opening i.e. a first opening 204 and a second opening 206. The first opening 204 includes a longitudinal axis A-A'. Further, the second opening 206 includes a longitudinal axis X-X'. The longitudinal axis A-A' of the first opening 204 and the longitudinal axis X-X' of the second opening 206 includes an angle Z that is unequal to 0 degree. In one embodiment the angle Z between the longitudinal axis A-A' of the first opening 204 and the longitudinal axis X-X' of the second opening 206 is from 45-60 degrees. The angle Z between the longitudinal axis A-A' of the first opening 204 and the longitudinal axis X-X' of the second opening 206 results in the cutting blades 208 to act on the object at a different angle when being in the first opening 204 than being in the second opening 206. For example, this may result in a cutting action when being in the first opening 204 and a acuminating action when being in the second opening 206. From the point of clarity and consideration the longitudinal axis A-A' of the first opening 204 and the longitudinal axis X-X' are not shown in further figures. The first opening 204 engages an object 110 like pipe, tube and the like. The first opening 204 performs a first cutting action (say cutting for the present disclosure) on the object 110. The cutting tool 200 has a blade 208 provided with or inserted in the first opening 204. A pipe 210 is inserted or provided into the first opening 204 along the longitudinal axis A-A' to get cut by the blade 208 into desired size, number and the like.

During implementation, the blade 208 may be brought into functioning by actuating a button, a knob, a spring and the like (not shown). Alternately or additionally, the blade 208 may be adapted to engage to a surface (say diameter or end) of the pipe 210 to be cut. Further, the blade 208 may be configured or set such that there can be a provision to pre-feed or change a depth of the cut during cutting action. The blade 208 may stay concealed in the housing 202 till the pipe 210 is fitted into the first opening 204.

In some embodiments, the housing 202 of the cutting tool 200 may be made up one or more of a material such as plastic, rubber, metal, carbon steel, high speed steel, non-ferrous cast alloys, cemented carbides, ceramics and sintered oxides, ceremets, diamond, cubic boron nitride, sialon and the like.

In some embodiments, the one or more first, second openings 204, 206 may be an axial opening, a circumferential opening, a helical opening, an oval opening, double oval opening and any other such dimensional opening known or used in the art.

In some embodiments, the blade 208 may be one or more of a clip point blade, a drop point blade, a gut point blade, a hawkbill blade, a needle point blade, a straight back blade, a sheepsfoot blade, and a spear point blade.

Figure 3:
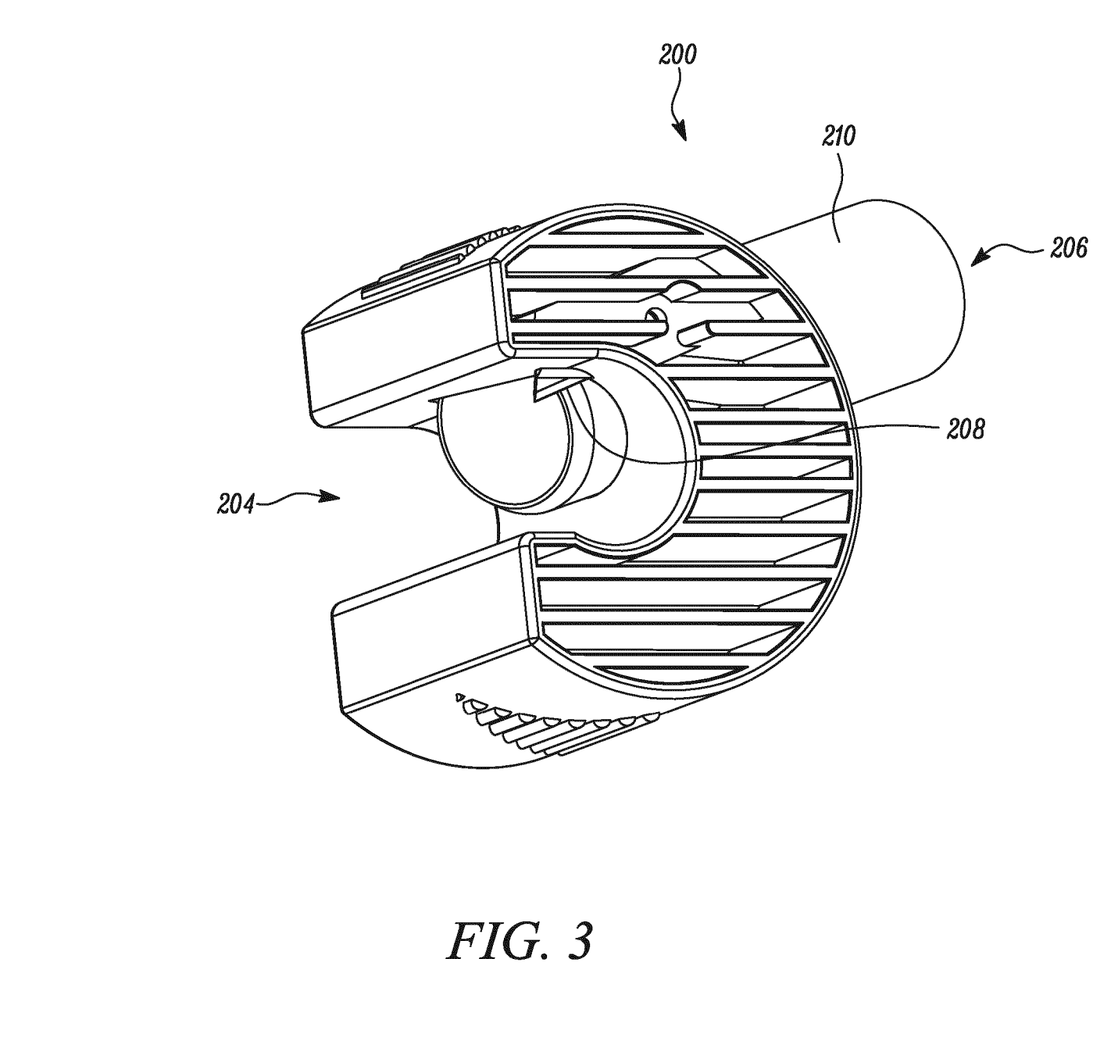
FIG. 3 shows a perspective view of the cutting tool performing chamfering, in accordance with an aspect of the present disclosure.

FIG. 3 illustrates the cutting tool 200 with the second opening 206. The second opening 206 allows to perform a second cutting action like chamfering, deburring and the like. Arrangement of the blade 208 makes it possible to do the second cutting action. This allows the cutting tool 200 to perform the first cutting action which is different from the second cutting action. The one or more first, second openings 204, 206 for cutting and chamfering of the pipe 210 are different, which may further allow simultaneous engagement of more than one pipes with the one or more first, second openings 204, 206 to perform the desired operations.

The cutting tool 200 of the present disclosure is hand operable. The pipe 210 is first inserted into any of the first opening 204 and the second opening 206 and then rotated manually or by some basic tools like spanners, wrenches and the like. Alternately or additionally, the rotational movement applied on the pipe 210 inserted in the first opening 204 and the second opening 206 may be different. The pipe 210 may be partially or completely rotated to get a desired cut.

In some embodiments, there may be more than two openings. During implementation, the one or more first, second openings 204, 206 may be made into functioning simultaneously and without posing any hindrance to each other. The first opening 204 and the second opening 206 may allow insertion of the pipe 210 and any other pipe at the very same time and perform simultaneous cutting actions to save on time and useful resources.

Figure 4A:
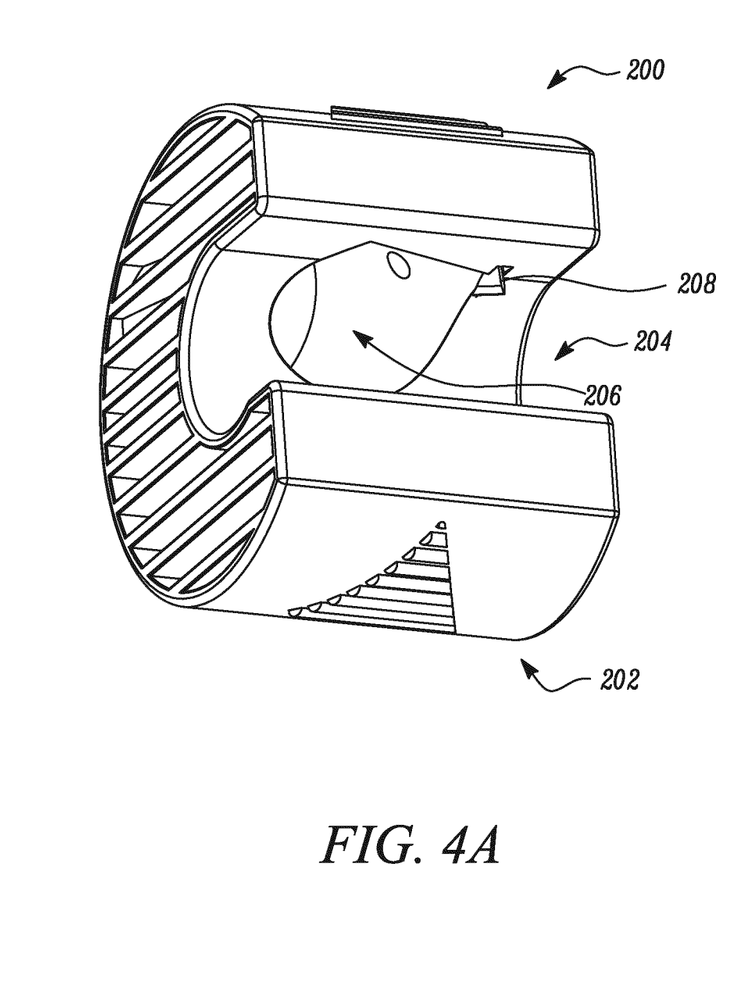
FIGS. 4A and 4B show perspective views of a blade and an end stop of the cutting tool, in accordance with an aspect of the present disclosure.

FIG. 4A illustrates positioning of the blade 208 within the cutting tool 200. The single blade 208 is arranged such that it is performing both the first cutting action and the second cutting action. The blade 208 may be attached as an insert by injection molding process. The blade 208 may also be removable. The blade 208 may be substituted by a new blade after any malfunctioning or after completion of suggested service life of the blade 208.

Figure 4B:
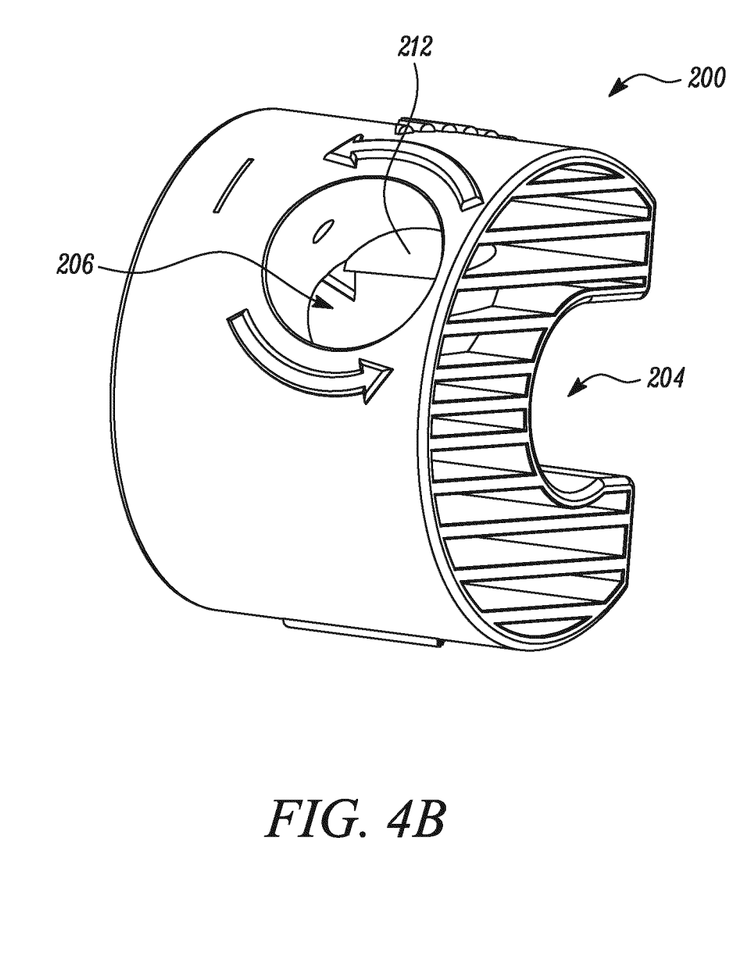

Making reference to FIG. 4B, an end stop 212 is illustrated in the second opening 206 to limit a height of the second action of the pipe 210. Alternatively, or additionally, the end stop 212 may also be present in the first opening 204. The end stop 212 in the first opening 204 may help in holding the pipe 210 firmly or may prevent loosening of the pipe 210. In some embodiments, the end stop 212 may be a protrusion, a shutter, a valve and the like.

Figure 5A:
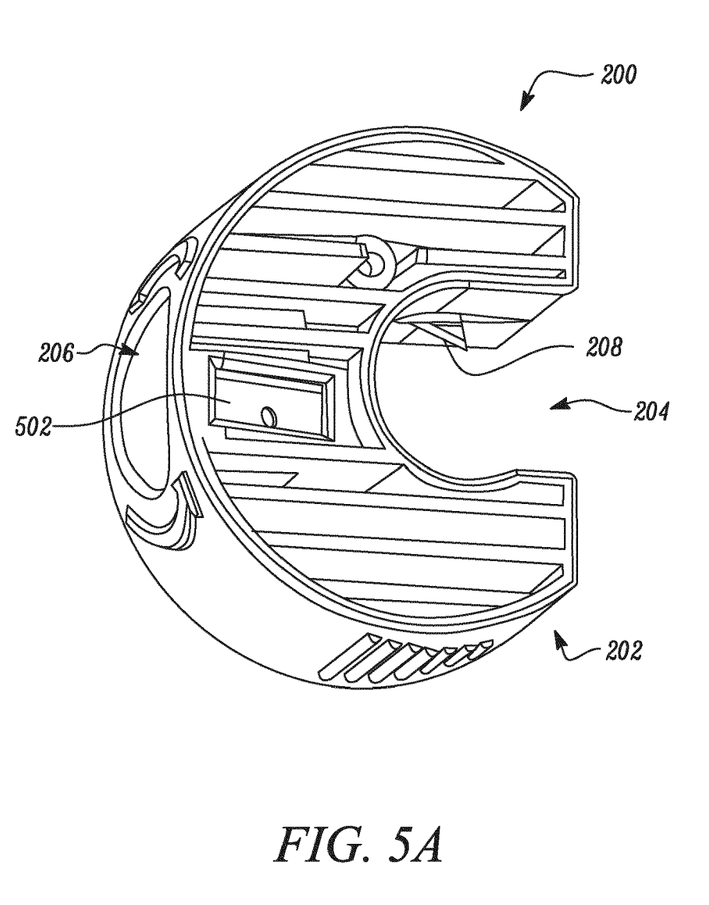
FIGS. 5A and 5B show perspective views of the cutting tool with one or more blades, in accordance with an aspect of the present disclosure.
Figure 5B:
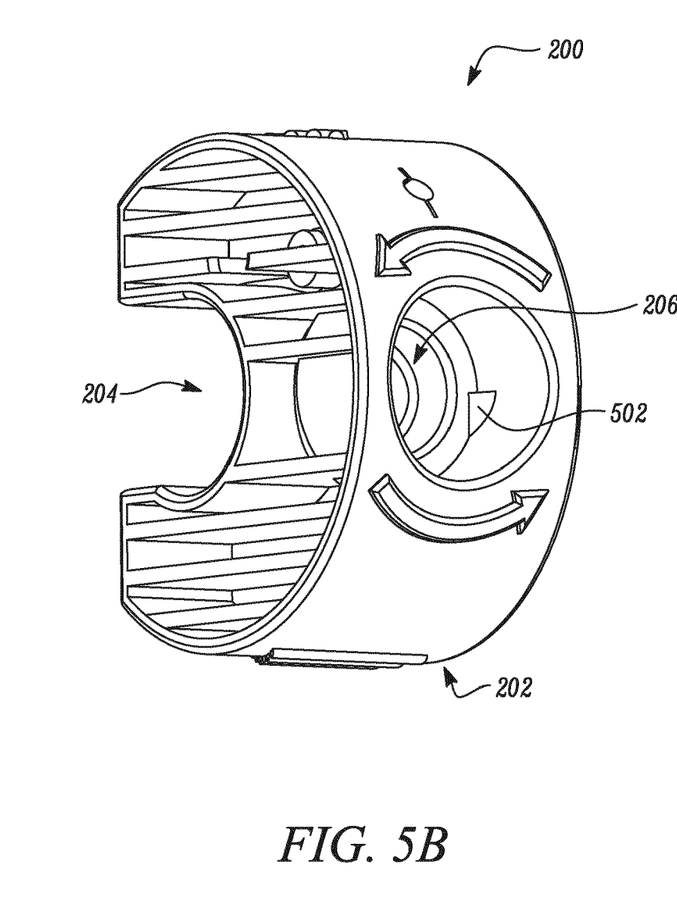

In an alternate embodiment as illustrated in FIGS. 5A and 5B, the cutting tool 200 includes more than one blade. A first blade 208 is inserted in a first opening 204. A second blade 502 is inserted in a second opening 206. The first blade 208 and the second blade 502 may be used interchangeably. The first blade 208 performs the first cutting action which is cutting. The second blade 502 performs the second cutting action. The second cutting action is chamfering. Moreover, the second cutting action may also include actions like deburring and the like.

The present disclosure provides the hand operated cutting tool 200 for pipes or tubes. The hand operated cutting tool 200 includes the housing 202. The housing 202 defines the at least one first opening 204 to receive the object 210 to perform the first cutting action. The first opening 204 defines a longitudinal axis A-A'. The housing 202 further includes the second opening 206. The second opening 206 is adapted to perform the second cutting action. The second opening 206 includes the longitudinal axis X-X'. Further, the longitudinal axis A-A' of the first opening 204 and the longitudinal axis X-X' of the second opening 206 include the angle Z therebetween that is unequal to 0 degree. The one or more cutting blades 208, 502 are operatively coupled to the first opening 204 and the second opening 206. The one or more cutting blades 208 is arranged such that it is performing both the first cutting action and the second cutting action. In some embodiments, each of the first cutting action and the second cutting action is performed by the one or more cutting blades 208, 502. In some embodiments, each of the first cutting action and the second cutting action is performed by the single blade 208, or by the cutting blade 502.

Figure 6A:
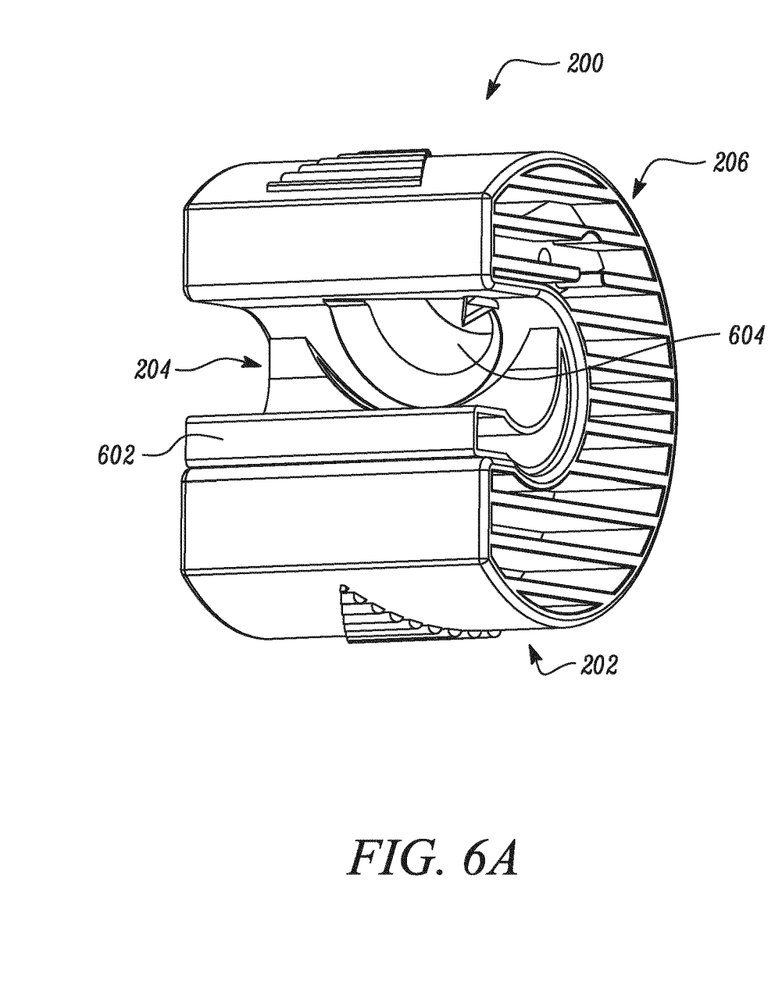
FIGS. 6A and 6B show perspective views of the cutting tool with one or more adapters, in accordance with an aspect of the present disclosure.
Figure 6B:
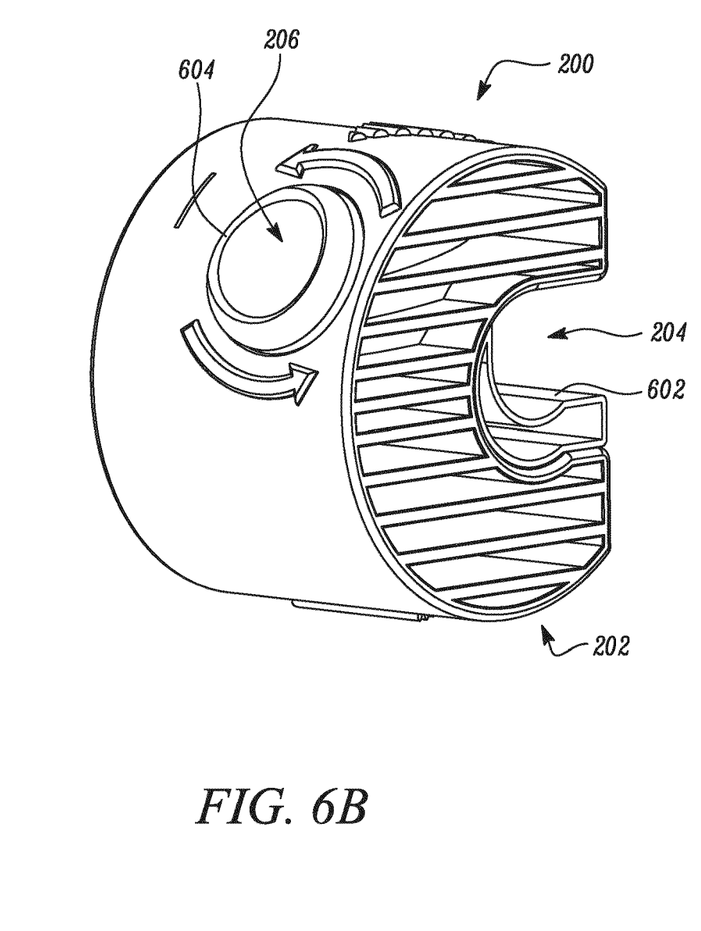

In an alternate embodiment as illustrated in FIGS. 6A and 6B, the cutting tool 200 includes one or more adapters i.e. a first adapter 602 and a second adapter 604. The one or more adapters 602, 604 allow to adjust the pipe 210. The one or more adapters 602, 604 may be elastic. The pipe 210 of different shapes, sizes, diameter and the like dimensions may be adjusted by the one or more adapters 602, 604. The one or more adapters 602, 604 may avoid need of any button, switch, knob and the like to reveal the blade 208.

In some embodiments, the pipe 210 may be prevented from uneven cutting as presence of the one or more adapters 602, 604 may provide support to the pipe 210. The one or more adapters 602, 604 may prevent the pipe 210 from shocks, jerks and the like. The one or more adapters 602, 604 may be removable as they may be fitted in the one or more first, second openings 204, 206 according to dimensions of the pipe 210.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Conventional Cutting Tool
102 Housing
104 Opening
108 Blade
110 Object/Pipe
150 Conventional Cutting Tool
152 Blade
154 Chamfered pipe end
200 Cutting Tool
202 Housing
204 First Opening
206 Second Opening
208 Blade
210 Object/Pipe
212 End Stop
502 Second Blade
602 First Adapter
604 Second Adapter
A-A' Longitudinal Axis
X-X' Longitudinal Axis
A Angle

The invention claimed is:

1. A hand operated cutting tool for pipes or tubes comprising:
    a housing, wherein the housing comprises:
        a first opening to receive an object to perform a first cutting action, and
        a second opening to receive the object to perform a second cutting action,
    wherein a first longitudinal axis extends through the first opening,
    wherein a second rotational axis extends through the second opening,
    wherein the first axis and the second axis define an angle therebetween that is unequal to 0 degrees;
    wherein a first cutting blades is operatively coupled to both the first opening and the second opening; and
    wherein the first cutting blades is arranged to perform both the first cutting action and the second cutting action responsive to rotation of the cutting tool about the first axis and the second axis, respectively.

2. The hand operated cutting tool of claim 1, wherein the cutting tool further comprises an end stop in the first opening, and the second opening to limit a height of an object during any of the first cutting action and the second cutting action.

3. The hand operated cutting tool of claim 2, wherein the object is one or more of a pipe and a tube.

4. The hand operated cutting tool of claim 2, further comprising one or more adapters adapted to operatively couple with the first opening and the second opening, wherein the one or more adapters are selected in accordance with a dimension of the object.

5. The hand operated cutting tool of claim 1, wherein the angle between the first longitudinal axis and the second rotational axis is from 45-60 degrees.

6. The hand operated cutting tool of claim 1, wherein the first cutting action is cutting and the second cutting action is chamfering.

7. The hand operated cutting tool of claim 1, wherein the housing is substantially C-shaped.

8. The hand operated cutting tool of claim 7, wherein the first opening is substantially centered in the C-shaped housing.

9. The hand operated cutting tool of claim 7, wherein the second opening extends through a sidewall of the C-shaped housing.

10. A hand operated cutting tool for pipes or tubes comprising:
- a housing, wherein the housing comprises:
    - a first opening to receive an object to perform a first cutting action, and
    - a second opening to receive the object to perform a second cutting action,
- wherein a first axis extends through the first opening,
- wherein a second axis extends through the second opening,
- wherein the first axis and the second axis define an angle therebetween that is unequal to 0 degrees,
- wherein a first cutting blade is operably coupled to both the first opening and the second opening, and
- wherein the first cutting blade is arranged to perform both the first cutting action and the second cutting action.

\* \* \* \* \*

UNITED STATES PATENT AND TRADEMARK OFFICE
CERTIFICATE OF CORRECTION

| | |
|---|---|
| PATENT NO. | : 11,813,681 B2 |
| APPLICATION NO. | : 17/799788 |
| DATED | : November 14, 2023 |
| INVENTOR(S) | : Thomas Renner et al. |

It is certified that error appears in the above-identified patent and that said Letters Patent is hereby corrected as shown below:

In the Claims

In Column 6, Claim 1, Line 42, "a first cutting blades" should read --a first cutting blade--

In Column 6, Claim 1, Line 44, "the first cutting blades" should read --the first cutting blade--

In Column 7, Claim 10, Line 14, "a first axis" should read --a first longitudinal axis--

Signed and Sealed this
Thirteenth Day of February, 2024

Katherine Kelly Vidal
*Director of the United States Patent and Trademark Office*